Patented Oct. 10, 1944

2,359,864

UNITED STATES PATENT OFFICE 2,359,864

ADDITION PRODUCTS OF A BETAINE ACID HALIDE AND A BASIC AMINE

Adrian Laverne Linch, Wilmington, Del., assignor to E. I. du Pont de Nemours & Company, Wilmington, Del., a corporation of Delaware No Drawing. Application July 20, 1942, Serial No. 451,683

5 Claims. (Cl. 260—205)

This invention pertains to pentavalent nitrogen addition compounds containing quaternary ammonium substituted acyl radicals.

It is an object of this invention to produce new quaternary ammonium derivatives having a multiplicity of uses in the industrial arts. A further object is to produce addition compounds of quaternary ammonium derivatives which are soluble in water and which may be easily decomposed into useful constituents. A still further object is to render more soluble organic amines which are normally difficultly soluble in water, thereby increasing the value of and creating new uses for said compounds. A still further object is to produce a new class of compounds of value in the dye, pharmaceutical, pesticide, wetting agent, detergent, tanning, corrosion inhibitor, textile auxiliary, electroplating, and flotation fields. Additional objects will become apparent from a consideration of the following description and claims.

These objects are attained in accordance with the present invention wherein addition compounds containing a quaternary ammonium acyl radical attached to a pentavalent nitrogen derivative are produced. In a more restricted sense these objects are attained by adding a primary, secondary or tertiary organic amine to a quaternary ammonium derivative containing a carbonyl halide or sulfonyl halide grouping. In a still more restricted sense these objects are achieved by producing addition products from a betaine derivative and an organic amine wherein the betaine derivative contains a carbonyl chloride grouping. In one of its preferred embodiments this invention pertains to addition compounds containing a betaine derivative as one radical and a pentavalent nitrogen derivative as another radical, and wherein said pentavalent nitrogen radical contains a therapeutically active sulfo grouping.

The invention may be more readily understood by a consideration of the following illustrative examples wherein the quantities are stated in parts by weight. In certain of these examples equations are given to represent the probable reaction which takes place.

EXAMPLE 1

*N-chloro-betainyl chloride pyridine*

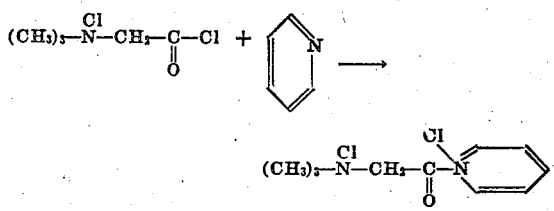

Twenty-eight parts of N-chloro-betainyl chloride, prepared according to Example 1 of copending application Serial No. 451,682, filed of even date herewith, entitled "Organic quaternary ammonium derivatives," is added to 85 parts of pyridine. A highly exothermic reaction takes place. After the temperature has ceased to rise further, the mixture is heated at 75-78° for three hours. The product crystallizes from the pyridine on chilling in an ice pack, and is recovered by filtration. The excess pyridine is washed from the cake with dry acetone, and the hydroscopic crystals dried in a vacuum desiccator over phosphoric anhydride. A nearly quantitative yield of N-chloro-betainyl chloride pyridine melting at 80° C. is obtained.

In a similar manner, N-chloro-betainyl chloride forms addition compounds with morpholine, piperidine, piperazine, quinoline, picolines, lutidines, methyl quinolines, alkaloids, such as atropine, quinine, brucine, morphine, caffeine and barbituric acids, substituted barbiturates such as veronal, vitamins such as thiamin, riboflavin, B$_6$ (2-methyl-3-hydroxy-4,5-dimethylol pyridine), and other heterocyclic nitrogen ring systems. Likewise, other quaternary ammonium substituted carbonyl and sulfonyl halides such as betainyl chloride sulfate, N-bromo-C-tetradecyl betainyl chloride, N-chloro-N-benzyl betainyl chloride, and other derivatives disclosed in the aforementioned copending application easily form addition compounds with heterocyclic nitrogen compounds.

EXAMPLE 2

*Purification of crude carbazole*

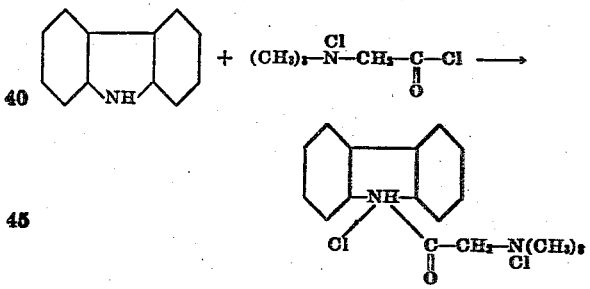

To a dry, boiling solution of 126 parts of crude anthracene, containing 22% carbazole, in 260 parts toluene is added 35 parts of N-chloro-betainyl chloride. The mixture is boiled under reflux for four hours, filtered hot and the filter cake washed with 175 parts of boiling toluene. The carbazole-N-chloro-betainyl chloride addition compound is extracted from the filter cake by agitation in 500 parts of water for two hours. The insoluble anthracene cake is combined with the toluene mother liquors, which on evaporation to dryness gives a nearly quantitative recovery of anthracene which is now essentially free of carbazole.

The carbazole is recovered from the aqueous extract by adding sodium carbonate until the mixture is alkaline, and filtering off the precipitate. In this manner a nearly quantitative separation of high purity carbazole is attained.

This method can be applied to the purification of a large number of other nitrogen containing compounds such as alkyl pyridines, quinoline, alkyl quinolines, phenanthrolines, aza-anthracenes, aza-benzanthrones, benzcarbazoles, diphenylamine, acridines, 3,3'-dicarbazyl, etc. from natural occurring sources, or from synthetic processes. Other quaternary ammonium substituted sulfonyl or carbonyl halides such as N-chloro-sulfobetainyl chloride, phenyl benzyl dimethyl ammonium sulfate sulfonyl chloride, etc. described in the aforementioned copending application can be employed with equal success.

EXAMPLE 3

*N-chloro-betainyl chloride-2-amino-naphtho(2-1)-thiazole*

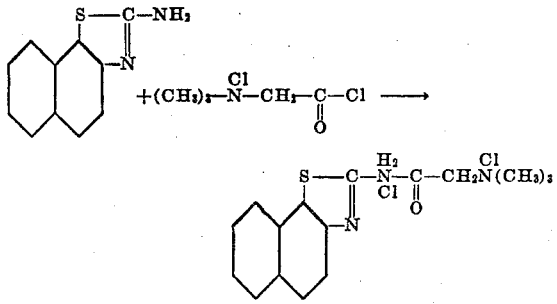

Thirty parts of 2-amino-naphtho-(2-1) thiazole and 33 parts of N-chloro-betainyl chloride are suspended in 175 parts of toluene. Over a period of one hour, the mixture is heated to boiling and refluxed for four hours. After cooling to room temperature, the mixture is filtered and the insoluble product dried on a steam bath. Sixty parts of water soluble addition compound is obtained. The 2-amino-naphtho (2-1) benzothiazole may be recovered by neutralizing an aqueous solution with sodium carbonate, or other alkaline reagents. The N-chlorobetainyl chloride 2-amino-naphtho (2-1) thiazole may be purified by crystallization from methyl alcohol. The crystals contain one molecule of methyl alcohol of solvation and melt at 232–233° C.

Other heterocyclic derivatives substituted by amino, or substituted amino groups form addition compounds with quaternary ammonium substituted sulfonyl or carbonyl chlorides in an analogous fashion. For example, 21 parts of meta-amino-phenyl methyl pyrazolone, and 40 parts N-chlorobetainyl chloride agitated with 50 parts of toluene in a ball mill for 48 hours gives a nearly quantitative yield of a very hydroscopic salt-like addition compound. In a like manner, amino pyridines, amino-quinolines, 3-amino carbazole, amino - acridines, 1 - dimethylamino-acridone, 4-amino-anthrapyridone, etc., yield addition compounds with other quarternary ammonium substituted sulfonyl, or carbonyl chloride disclosed in the aforementioned copending application.

EXAMPLE 4

*N-chloro-betainyl chloride-alpha(para-amino-phenyl)-sulfonamido-pyridine*

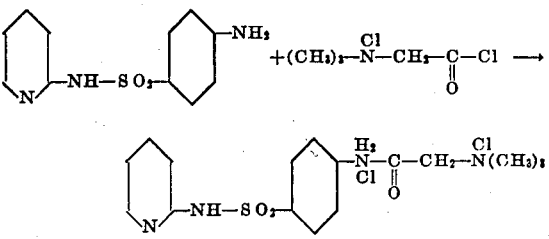

Two hundred and five parts of N-chloro-betainyl chloride and 124 parts of sulfapyridine are suspended in 260 parts of dry benzene and agitated at room temperature for 60 hours. The crude product is recovered by filtration, and extracted with 1600 parts of 75% acetone by agitating at room temperature. The insoluble by-product (betaine hydrochloride) is removed by filtration, and the mother liquors evaporated to dryness under vacuum at 38–40°. Last traces of water are removed by distilling with benzene under vacuum. The product is further purified by crystallization from alcohol. The crystals so obtained contain one molecule of alcohol of crystallization and melt at 128–132° C.

A variety of therapeutically valuable compounds such as para-amino-benzene sulfonamide (sulfanilamide), sulfadiazine, sulfathiazole, para-amino-phenyl sulfonamide guanidine, ephedrine, procaine, butesin, proflavin, diamino dihydroxy arseno benzene, benzocaine, antipyrene, and other nitrogen containing physiologically active compounds also form water soluble addition compounds with quaternary ammonium sulfonyl or carbonyl halides. These addition compounds readily regenerate the original insoluble compound when neutralized to pH 6 to 7, or greater.

EXAMPLE 5

*4,4'-diguanido diphenyl N-chloro-betainyl chloride*

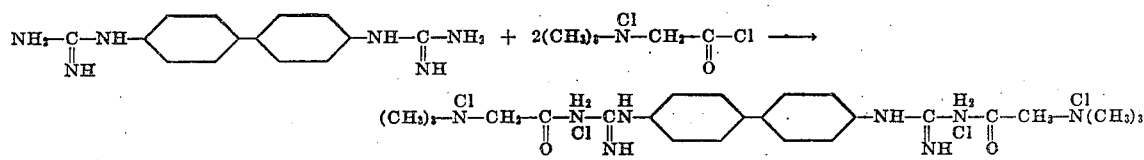

13.4 parts of 4,4'-diguanido diphenyl is dissolved in 100 parts of pyridine. To this solution, 21 parts of N-chloro-betainyl chloride is added. The reaction is strongly exothermic and requires cooling at first. After agitating at room temperature for 48 hours, the addition compound is recovered by filtration and washed free of pyridine by trituration in 50 parts of methyl alcohol. In this manner 13.3 parts of crystalline material melting at 219–221° C. with decomposition and containing two molecules of methyl alcohol of crystallization is obtained.

Analysis: per cent nitrogen found 15.94—theory 16.55.

The remainder of the addition compound is recovered by evaporating the methyl alcohol extract. The addition compound is readily soluble in water and regenerates the insoluble 4,4'-diguanido diphenyl on neutralization with sodium carbonate.

This principle of solubilization by forming an addition compound with a carbonyl or sulfonyl chloride derivative substituted by one or more quaternary ammonium groups is applied with equally good results to a wide variety of guanidine and biguanidine derivatives such as phenyl biguanidine, meta-nitro-biguanidine, para-aminophenyl biguanidine, para-amino-phenyl sulfonamido guanidine, 1,4-di-(meta-biguanido)phenyl amino anthraquinone, azo dyes containing guanido or biguanido groups such as 3-biguanido-2'-hydroxy phenyl azo naphthalene, stearyl biguanidine, cyclohexyl biguanidine, ortho-hydroxyphenyl biguanidine, arginine, etc. Furthermore, the principle is not confined to N-chloro-betainyl chloride, but works equally well with other quaternary ammonium carbonyl or sulfonyl halide disclosed in the aforementioned copending application.

Example 6

*Alpha-naphthylamine N-chloro-betainyl chloride*

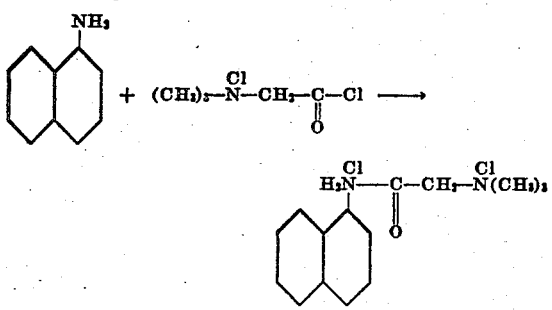

Seventy-two parts of alpha-naphthylamine, 87 parts of toluene, and 108 parts of N-chlorobetainyl chloride are ground together in a ball mill for 24 hours. The toluene is decanted off, 160 parts of 10% anhydrous methyl alcohol in dry acetone added to the crude addition compound, and the milling continued to remove any excess N-chloro-betainyl chloride present. The purified product is recovered by filtration. The dried product melts at 199–204° C. with decomposition. Analysis: Per cent alpha-naphthylamine by nitrite titration: found 40.9—theory 45.3.

The presence of a small amount of N-chlorobetainyl alpha-naphthylamine (amide) accounts for the difference between the theoretical and experimental values for alpha-naphthylamine.

The addition compound is extremely soluble in water and regenerates alpha-naphthylamine rapidly when neutralized to pH values greater than 5. Applied to cotton fabric, the product is an excellent resist for effects under vat dyed grounds.

2,4-dinitro-aniline, meta-nitro-aniline, 2,5-dichloro-aniline, meta-nitro-para-toluidine, diphenylamine, and other arylamines give nearly quantitative yields of the corresponding addition compounds with N-chloro-betainyl chloride under similar conditions, i. e. agitation in an inert diluent such as toluene until reaction is complete.

Arylamines substituted by sulfonamide groups are especially reactive, for example, 19 parts of N-chloro-betainyl chloride agitated at room temperature for 24 hours with 17.2 parts of para-amino-benzene sulfonamide in 87 parts of toluene produces a quantitative yield of the water soluble addition compound melting at 188–190° C. with decomposition. Analysis (after washing with methyl alcohol-one mole methyl alcohol of crystallization) per cent nitrogen—found 11.88; theory 11.50.

Example 7

*N-bromo-C-tetradecyl betainyl chloride-triamylamine*

Seventy-three parts of N-bromo-C-tetradecyl betainyl chloride prepared according to Example 4 of the aforementioned copending application and 33 parts of triamylamine are dissolved in 1750 parts of dry benzene. The mixture is heated to boiling to completely dissolve the components, then cooled to room temperature, allowed to stand two days and chilled in an ice pack. The product is recovered by filtration and after drying at room temperature melts at 152–154° C. Analysis: Per cent nitrogen found 4.47; theory 4.41.

The addition compound is exceedingly soluble in water and exhibits excellent properties as a detergent and foaming agent.

If instead of triamylamine, octahydro-ethyl carbazole is employed, the addition compound N-bromo-C-tetradecyl betainyl chloride octahydroethyl carbazole is obtained. The product is obtained as white plates which melt at 145–148° C. Analysis: Per cent nitrogen found 4.46; theory 4.52. The complex is quite soluble in water and exhibits outstanding surface active properties.

Similar water soluble addition compounds are produced by condensing N-bromo-C-tetradecyl betainyl chloride with oleic dimethylamide, pyridine, para-nitro-aniline (M. R.=71–75°, per cent total halogen as chlorine, found 8.61; theory 8.08), para-phenylene diamine and para-amino-dimethyl benzamide (melting range=179–182° C.). The arylamino derivatives absorb nitrous acid and couple with components such as R-salt, beta-naphthol, etc. The water soluble addition compounds with meta-amino-phenol and 1,6-amino-naphthol couple with aryl diazonium compounds such as para-nitro-benzene diazonium chloride to yield water soluble azo dyes.

Example 8

*1,4-diamino-anthraquinone N-chloro-betainyl chloride*

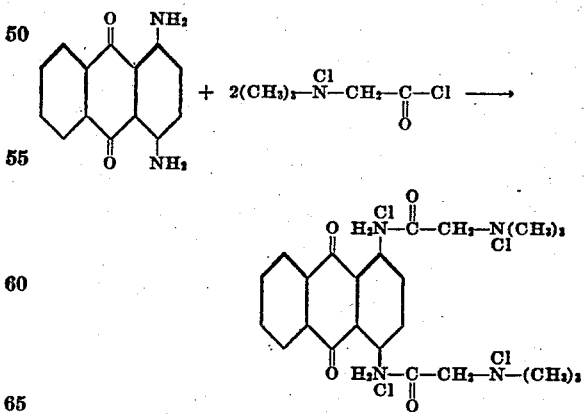

Twenty-four parts of 1,4-diamino-anthraquinone and 52 parts of N-chloro-betainyl chloride are suspended in 350 parts of toluene. The mixture is heated to boiling under reflux in one and one-half hours, and held on temperature 4 hours, or until the color of the 1,4-diamino-anthraquinone base disappears. The mixture is cooled to room temperature and the quantitative yield of tan colored addition complex recovered by filtration. The product may be purified by crystallization from methyl alcohol. Analysis: Per cent nitrogen found 9.96; theory 9.62.

The addition compound is completely soluble in water and has excellent affinity for cellulose acetate, silk, wool and nylon fibers. The 1,4-diamino-anthraquinone is quickly regenerated by running the dyed fiber into a dilute sodium carbonate bath for a short time. Remarkably good results are obtained with 1,4-diamino-anthraquinone-N-chloro-betainyl chloride addition compound in printing on cellulose acetate, silk or nylon cloth. If a compound which regenerates alkali on heating, such as sodium acetate, dimethyl ammonium dimethyl dithiocarbamate, ammonium carbonate, biguanidine carbonate, etc. is incorporated in the printing paste, the prints can be developed to an increased color value in a rapid steam ager. The saving in time, increase in color value and decreased loss due to sublimation or "marking off" encountered in the older methods of application are at once obvious.

Good results can also be obtained by condensing 1-4-5-8 tetra-amino-anthraquinone with two or more molecular equivalents of N-chloro-betainyl chloride. The steel gray product is completely soluble in water, and has excellent affinity for cellulose acetate, silk, wool and nylon fibers. The color is developed in either dyeing or printing as described above.

1-amino-4-hydroxy-anthraquinone, 1,4-dimethylamino-anthraquinone and 1-amino-4-methylamino-anthraquinone also form water soluble addition compounds with N-chloro-betainyl chloride. The dyeing properties are quite similar to those described for 1,4-diamino-anthraquinone N-chloro-betainyl chloride. Other quaternary ammonium carbonyl or sulfonyl halides described in the aforementioned copending application also form water soluble addition compounds which possess properties in common with those obtained with N-chloro-betainyl chloride.

Example 9

*Para-amino-azo benzene N-chloro-betainyl chloride*

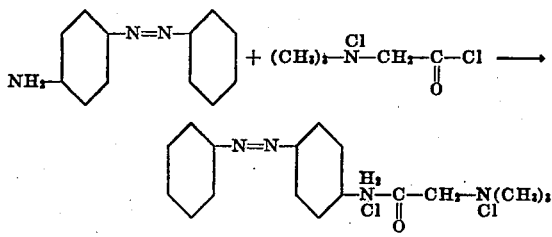

17.2 parts N-chloro-betainyl chloride and 19.7 parts of para-amino-azo benzene are suspended in 170 parts of dry benzene, and the mixture boiled under reflux for 2½ hours. After cooling to room temperature the product is recovered by filtration. The dark reddish-brown addition compound melts at 183–184° C., is readily soluble in water, decomposes to the original para-amino-azo benzene in alkaline solutions, diazotizes in the presence of nitrous acid, and dyes wool, silk, nylon and cellulose acetate fibers in bright yellow shades which are fast to washing.

A variety of azo dyes may be employed in place of para-amino-azo-benzene. The following table briefly summarizes the results to be expected:

| Diazo component | Coupling component | Reaction medium | Dyeing prop. | |
|---|---|---|---|---|
| | | | Fiber | Color |
| p-Nitro-aniline | Aniline | Toluene | Wool | Yellow-orange. |
| Do | b-Hydroxy ethyl ethyl aniline | do | Cellulose acetate | Scarlet. |
| Benzidine | Meta-toluidine | do | Cotton | Yellow. |
| Do | m-Amino-phenyl-pyrazolone carboxylic acid | do | do | Red. |
| p-Nitro-aniline | b-Amino-ethyl aniline | do | Cellulose acetate | Scarlet. |
| Benzidine | m-Amino-phenyl methyl pyrazolone | Dimethyl formamide | Cotton | Red. |
| p-(b-Amino-ethyl)-aniline | 2-hydroxy-3-naphthanilide | Pyridine | Nylon | Do. |
| m-Amino-phenyl-bi-guanidine | do | Toluene | Wool | Scarlet. |
| 3-(dimethylamino-methyl)-4-hydroxy aniline | Phenyl methyl pyrazolone | do | Nylon | Bright yellow. |

From an inspection of the above list, it is at once obvious that in general azo dyes which are substituted by one or more primary, secondary or tertiary amino groups will form addition compounds with quaternary ammonium carbonyl and sulfonyl halide derivatives. These addition complexes will exhibit varying degrees of water solubility depending upon molecular weight and other structural factors. Furthermore, it is not necessary that the amino substituted dye molecule be free of other solubilizing groups such as carboxyl or sulfonic acid groups to form valuable addition compounds with quaternary ammonium acid halides and yield dyes possessing additional valuable properties. For example, the azo dye produced by coupling sulfanilic acid with meta amino phenyl methyl pyrazolone forms an addition compound with N-chloro-sulfo-betainyl chloride, and we have disclosed a dye containing carboxylic acid groups in the above table. Mettallized azo dyes which contain primary, secondary, or tertiary amino groups may be given increased solubility in water by condensing with carbonyl or sulfonyl halide substituted quaternary ammonium compounds to form salt-like addition compounds which are readily regenerated by neutralizing with alkaline reagents to the original dyestuffs.

Example 10

*N-chloro-trimethylamino-methyl-beta-naphthoyl chloride-octadecylamine*

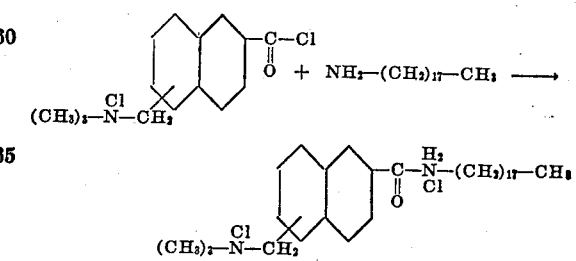

Ninety parts of x-(N-chloro-trimethylaminomethyl)-beta-naphthoyl chloride prepared according to Example 6 of the aforementioned copending application is added to a solution of 84 parts of octadecylamine dissolved in 350 parts of pyridine. The reaction is somewhat exothermic and the mixture sets to a gel. Over ½ hour, the mixture is heated to boiling under reflux and held on temperature 2½ hours. The mixture is cooled to room temperature, and 80 parts of dry acetone are added to facilitate filtration. There is obtained a theoretical yield of the addition compound, which melts at 201° C. is soluble in water, and exhibits unusual surface active properties such as foaming, wetting out and detergent action. Analysis: per cent nitrogen found 4.79; theory 4.97.

Similar results are obtained by allowing di(beta-hydroxy-ethyl) dodecylamine to react with N-chloro-benzyl betainyl chloride, dimethyl amino methyl para-octyl phenol with benzyl phenyl dimethyl ammonium sulfate sulfone chloride, beta-amino-ethyl oleic amide with N-chloro-(N'-chloro-betainyl)-betainyl chloride, etc.

Example 11

*Stearamido methyl pyridinium chloride—N-chloro-betainyl chloride*

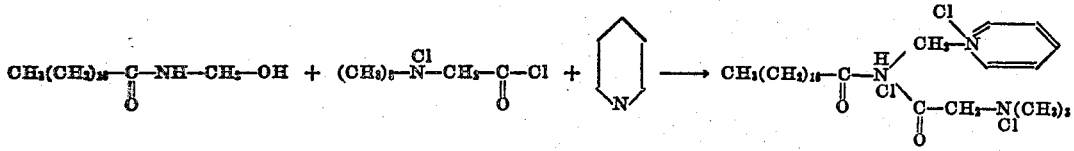

A mixture composed of 15.7 parts of methylol stearamide, 100 parts of pyridine and 10 parts of N-chloro-betainyl chloride is agitated at room temperature for 18 hours, then heated to 50° C., held on temperature 2½ hours, heated to 76° C. and held on temperature 3 hours. The reaction mixture is cooled to room temperature, filtered and the filter cake triturated in 85 parts of dry acetone. The product is recovered by filtration, and washed with dry acetone until free of pyridine. A nearly qualitative yield of water-soluble product is obtained.

Analysis: Nitrogen found 7.45%—theory 7.67. Chlorine found 12.95%—theory 12.98.

The addition complex gives a clear, stable solution in dilute sodium acetate solution, but yields a precipitate with dilute hydrochloric acid, or sodium carbonate. Applied to cotton fabric and baked for three minutes at 130° C., excellent water-proofing effects are obtained.

Example 12

*N(N'chloro-betainoxy)-methyl carbazole N-chloro-betainyl chloride*

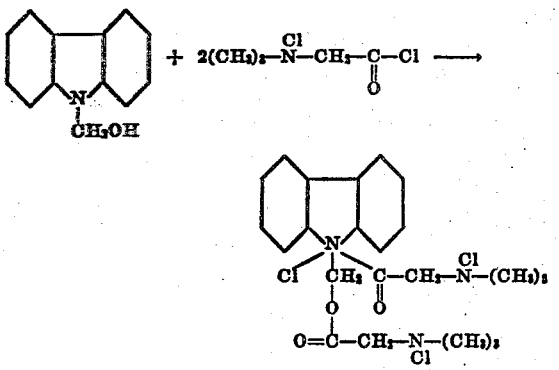

To a solution of 100 parts of N-methylol carbazole dissolved in 1000 parts of pyridine is added 103 parts of N-chloro-betainyl chloride. The mixture is agitated 24 hours at room temperature and then filtered. The pyridine is removed from the crude product by washing with 450 parts of dry acetone. The product melts at 220–224° C. is soluble in water and yields a precipitate from aqueous solution when neutralized with sodium carbonate.

Analysis: per cent nitrogen found 8.73—theory 8.96.

It is to be understood that the above examples are representative merely of the many modifications embraced within the scope of the present invention. They may be varied widely both with respect to the reactants and the conditions of reaction without departing from the scope of this invention.

The temperature of reaction may be varied widely without interfering with the desired objectives. As a general rule temperatures between −80° C. and +150° C. are satisfactory. For optimum results in a great majority of instances temperatures from 0° C. to 120° C. are preferred.

The reactions are generally carried out under normal atmospheric pressure. It is to be understood, however, that the use of superatmospheric or subatmospheric pressures is contemplated and, in some instances, will be helpful. For instance, superatmospheric pressures will assist in reducing the loss of volatile components, such as hydrohalic acids. On the other hand, the removal of solvents or diluents may be facilitated by the use of subatmospheric pressures. If either of these results is desired it may be obtained in the manner just referred to.

From the standpoint of economy it is advisable to use one molecular equivalent of quaternary ammonium derivative for each primary, secondary or tertiary nitrogen group which is to be converted to a pentavalent nitrogen radical. Completion of the reaction may ordinarily be obtained, if desired, by using 10% to 50% excess of the quaternary ammonium derivative. It should be noted that there is generally no necessity of converting each nitrogen group of a polyamino substituted molecule to an addition complex in order to obtain the desirable results of this invention. For example, only two molecular equivalents of N-chloro-betainyl chloride are necessary to produce a water soluble addition compound with 1,4,5,8-tetramino-anthraquinone.

The use of an inert diluent is usually advantageous in providing sufficient physical contact between the reactants to insure complete conversion, but is not essential to cause the reaction. It is not necessary that either of the reactants be soluble in the diluent to obtain efficient reaction, nor is any specific quantity of diluent required. However, the use of a solvent in which the nitrogen base is soluble is frequently helpful since the change in color as the reaction progresses may be a convenient indication of the end point. Diluents found to be satisfactory for a wide variety of reactions are hydrocarbons such as petroleum naphtha, kerosene, benzene, toluene, xylene, decalin, and cyclohexane; chlorinated hydrocarbons such as chloroform, chlorobenzene, and ethylene dichloride; tertiary amines such as pyridine, quinoline, dimethylaniline, and dimethyl formamide; esters such as ethyl acetate and methyl butyrate; ethers such as dioxane, diethyl ether, dibutyl ether, and glycol diethyl ether. It is, of course, to be understood that the aforesaid solvents and diluents are representative merely of the many which may be used for this purpose, and that two or more of them may be used without departing from the scope of this invention.

The time required to bring the reaction between any given nitrogen base and the quaternary ammonium derivative to completion will depend to a large extent upon the temperature and the reactivity of the components. Temperatures appreciably above 100° C. for long periods of time are ordinarily to be avoided when possible, as many addition compounds slowly decompose to yield hydrohalic acids and the corresponding quaternary ammonium substituted amide under such conditions. Furthermore, prolonged and/or excessive heating may produce polymerization or self-condensation of the quaternary ammonium acid halide. For optimum results over a wide range of conditions, a long reaction time at a relatively low temperature is to be preferred to a short reaction time at a high temperature.

The quaternary ammonium derivatives embraced within the scope of this invention are exceedingly varied, as is apparent from a consideration of the numerous examples and descriptive subject matter hereof. These compounds are referred to in considerable detail in a copending application filed of even date herewith, Serial No. 451,682, entitled "Organic quaternary ammonium derivatives." Quaternary ammonium derivatives of this type have substituted thereon an acid halide grouping, preferably a carboxylic acid chloride or -bromide or a sulfonic acid chloride or -bromide. The majority of them conform to the following general formula:

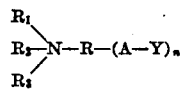

in which R=a bifunctional organic radical connecting N with A. Examples of such groups are alkylene, cyclo-alkalene, aralkylene, arylene, heterocyclic or two or more such groups which are like or unlike connected by

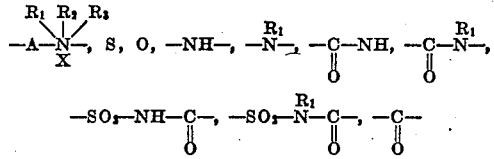

and their substitution products such as halogeno, nitro, nitroso, carboxyl, sulfonic, halogeno alkyl, alkoxy, etc.

$R_1$, $R_2$, $R_3$=alkyl, cyclo-alkyl, aralkyl, aryl, heterocyclic, $R_1$ and $R_2$ together with N form a heterocyclic ring, or $R_1$, $R_2$ and $R_3$ together with N form a heterocyclic ring, and their substitution products.

X=anion
Y=fluorine, chlorine, or bromine
A=

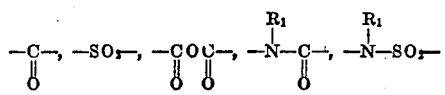

$n$=a small, whole number.

For the majority of uses betaine type derivatives have been found to give excellent results when used as the quaternary ammonium derivative in this reaction. These derivatives conform to the general formula and may be substituted in the manner previously referred to.

The reactants added to the quaternary ammonium derivatives, in accordance with this invention, are primary, secondary or tertiary organic amines, or mixtures of the same. Numerous amines of this type have previously been referred to, and for the sake of brevity will not be set out at this point. It should be understood, however, that the invention is not restricted to the use of these specific amines but is equally applicable to the many other well known primary, secondary and tertiary organic amines.

It should also be understood that mixtures of two or more quaternary ammonium derivatives and/or mixtures of two or more primary, secondary and/or tertiary organic amines are contemplated. By the selection of a suitable mixture of these reactants the advantages of the resulting addition compounds for any specific use may be further enhanced.

By means of the present invention it is possible to produce a multitude of organic quaternary ammonium derivatives which have many uses in the industrial arts. These compounds are, for the most part, readily soluble in water. Initially insoluble, or difficultly soluble, amino compounds may have their solubility in water greatly increased by converting them to the addition compounds embraced herein. Furthermore, the original amino derivatives may be readily regenerated from the addition compounds, for instance, through the simple expedient of neutralizing with an alkaline reagent. This important feature of the invention lends itself to numerous practical uses. For example, dyestuffs which are normally water insoluble, but which contain a primary, secondary or tertiary amino group may be rendered water soluble by forming an addition compound with a quaternary ammonium halide, as previously mentioned. The so formed addition compound may be applied to textile fibers and the original insoluble color then regenerated by a short immersion in an alkaline bath. In this manner insoluble pigments may be applied to textiles to yield dyeings of improved fastness properties, by a simple operating procedure. The usual vatting procedure encountered in vat dyeing, pigment padding or diazotization and coupling necessary for Ice and Naphthanil Colors is entirely avoided with a subsequent saving in time, machinery and materials.

The water soluble addition compounds included within the ambit of the present invention exhibit outstanding merit as printing colors. For example, cellulose acetate cloth can be printed with a derivative such as N-chloro-betainyl chloride 1,4-diamino anthraquinone in the presence of a reagent such as sodium acetate which produces alkali at elevated temperatures. The dye is completely regenerated and fixed by three minutes exposure to steam. Sublimation, dullness and low color value frequently encountered in the ordinary procedure are entirely absent in prints obtained in this manner. The same principle is likewise applicable for other goods such as silks, woolens, cotton, rayon, nylon, etc.

In many cases dyes in the form of the addition complexes with quaternary ammonium halides, embraced herein, show affinity for various fibers which are not normally dyed by the insoluble form. For instance, cotton and cellulose acetate dyes in the solubilized form hereinbefore described show a high affinity for wool, nylon and silk and the dyeings on regeneration in an alkaline bath exhibit excellent fastness properties.

In addition to the foregoing the present invention possesses numerous other advantages which should be readily obvious to one skilled in the art from a consideration of the preceding description and the following claims. Among these advantages may be mentioned solubilization of various otherwise insoluble pharmaceutical preparations in such manner that they may be orally administered. In this connection N-chloro-betainyl-chloride has outstanding merit, as have various other betaine derivatives and related products included herein. The by-product betaine which is formed when addition products of the betaine type are subjected to the body fluids is physiologically inert. The therapeutic component of such addition products is thereby released in the internal organs of the body wherein it may work more expeditiously than if it were administered by injection or in some other manner. As an illustration, the N-chloro-betainyl chloride addition compound with sulfapyridine, previously described herein, is extremely soluble in water and the pH of its aqueous solution approximates the acid concentration of the stomach contents. When this compound is subject to pH values above 5, such as occur in the blood stream, the sulfapyridine is rapidly regenerated therefrom. As a result, physiologically active sulfapyridine is produced when the aforesaid addition compound is absorbed from the stomach by the blood stream. The so produced sulfapyridine is then enabled to act much more efficiently than would otherwise be possible. At the same time, the betaine component of the reaction is harmless and produces no deleterious effects upon the human body.

The ease with which the addition compounds embraced within the scope of this invention are produced may be taken advantage of in the separation and purification of mixtures of organic compounds. This advantage of the invention is illustrated in Example 2, wherein carbazole is efficiently separated from a naturally occurring mixture with hydrocarbons, such as anthracene, phenanthrene, etc. By means of this feature valuable pharmaceutical and chemical products may be isolated and purified. The addition complex does not alter the original basic structure of the therapeutic or other agent in any disadvantageous manner. It has the effect of preserving this basic structure with all its advantages and at the same time increasing its water solubility while decreasing its hydrocarbon solubility.

Among a few of the many other helpful applications reference may be made to the preparation of wetting agents, detergents, dye resist agents, textile softening agents, dye fixing agents, corrosion inhibitors, insecticides, fungicides, leather treating agents, electroplating agents, stripping agents, flotation agents, purification of biological preparations, cosmetics, rubber auxiliaries, tanning agents, and the like.

As many apparently widely different embodiments of this invention may be made without departing from the spirit and scope thereof, it is to be understood that the invention is not limited to the specific embodiments thereof except as defined in the appended claims.

I claim:

1. The acid addition products of a betaine acid halide and a basic organic amine represented by the following formula:

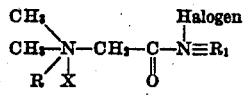

wherein R represents a hydrocarbon group, X represents an anion of a strong acid; and N≡R₁ represents a basic reacting organic amine.

2. The products of claim 1 wherein X represents halogen.

3. N-chloro - betainyl chloride - alpha(para-amino-phenyl)-sulfonamido-pyridine.

4. Para-amino-azo benzene N-chloro-betainyl chloride.

5. N-chloro-betainyl chloride-carbazole.

ADRIAN LAVERNE LINCH.